Aug. 18, 1931. H. DUNKELMANN 1,819,744
INTERNAL COMBUSTION ENGINE COOLING SYSTEM
Filed May 17, 1930 2 Sheets-Sheet 1
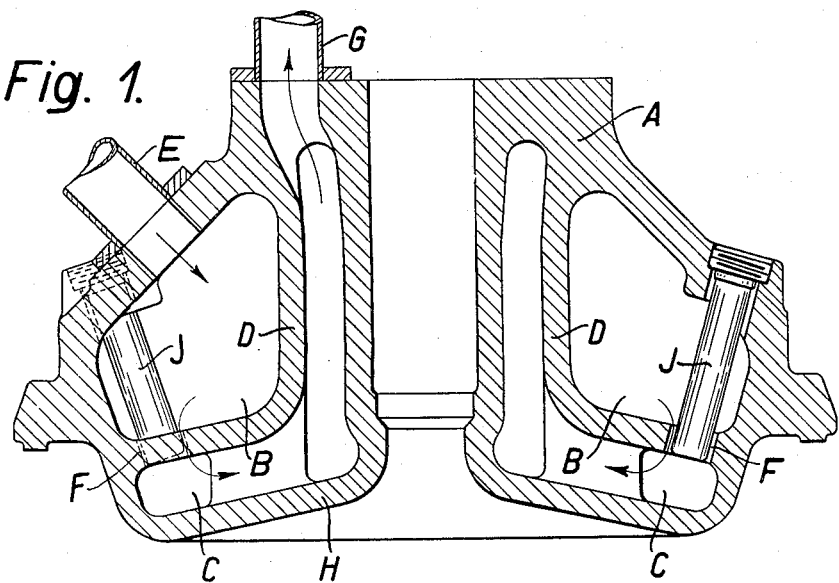
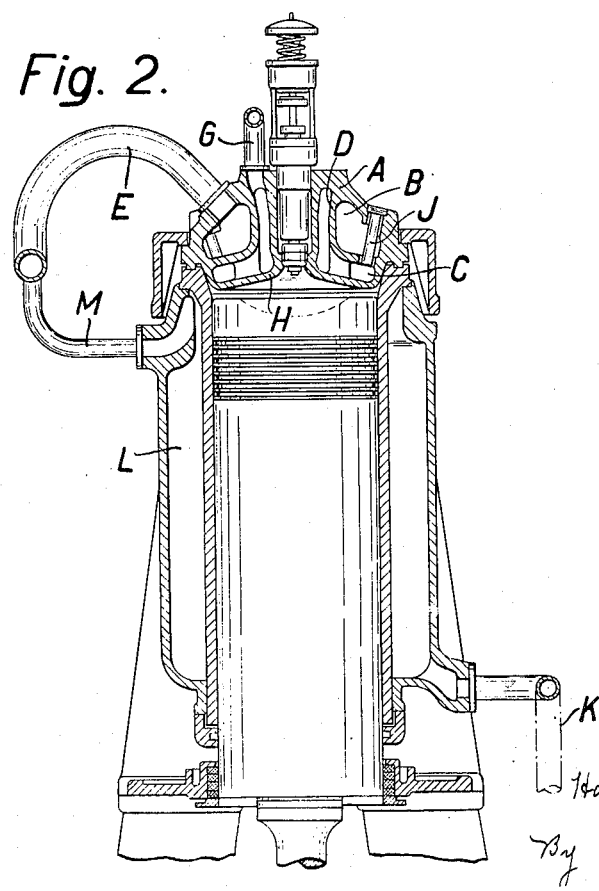

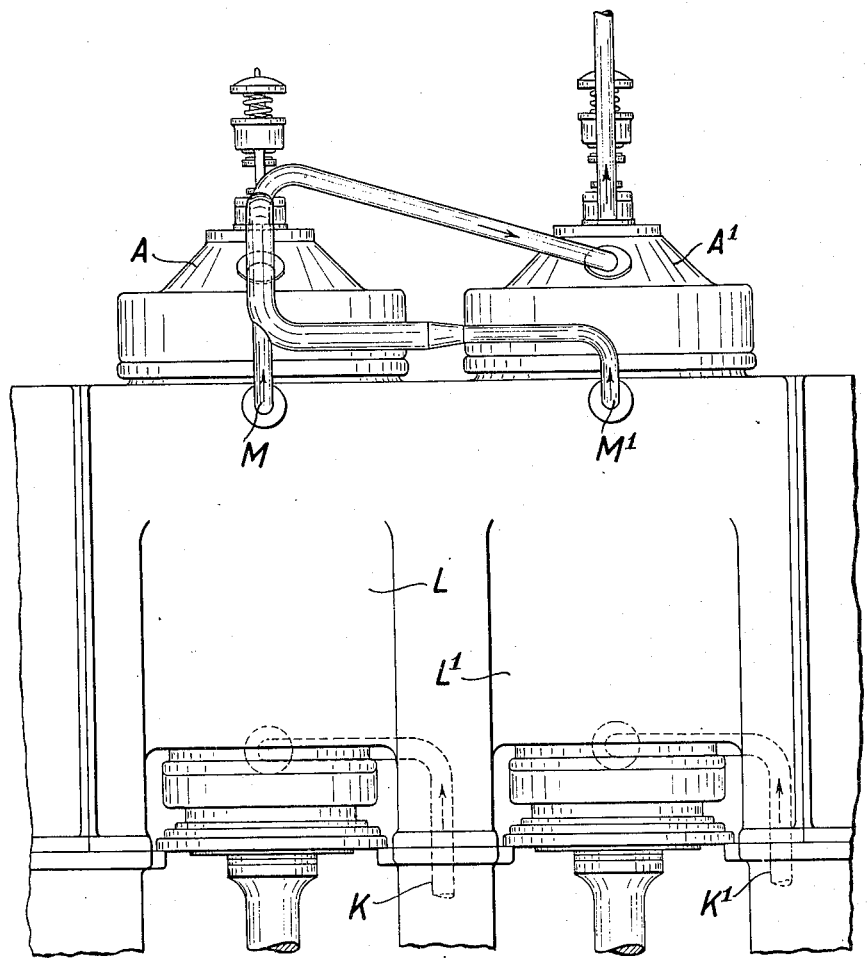

Patented Aug. 18, 1931

1,819,744

UNITED STATES PATENT OFFICE

HANS DUNKELMANN, OF KIEL, GERMANY, ASSIGNOR TO FRIED. KRUPP GERMANIA-WERFT AKTIENGESELLSCHAFT, OF KIEL-GAARDEN, GERMANY

INTERNAL COMBUSTION ENGINE COOLING SYSTEM

Application filed May 17, 1930, Serial No. 453,301, and in Germany May 27, 1929.

The invention relates to the conduction of the cooling water in the cylinder covers of internal combustion engines, in which covers two annular cooling water chambers are provided that are separated from one another by a partition, the one of these chambers serving to receive first and distribute the cooling water while the other chamber effects the cooling action proper on the cylinder cover. The invention consists in the fact that the partition has passages uniformly distributed on its outer circumference and the total sectional area of which is notably smaller than the sectional area of the outlet attached to the central portion of the inner cooling chamber, so that a considerable drop of pressure is obtained between the two cooling water chambers.

In order that the invention can be more readily understood, an embodiment of the same is illustrated by way of example in the accompanying drawings in which Figure 1 is a vertical central section through a cylinder cover fitted with the new arrangement, Figure 2 is a vertical section through one of the cylinders of an internal combustion engine, on a reduced scale, and Figure 3 is an external side view corresponding to Figure 2.

Referring first to Figure 1, A denotes the cylinder cover which includes two cencentrical annular cooling water chambers B and C separated from one another by a partition D of angular cross section. The cooling water enters chamber B through an inlet pipe E and from there passes through a plurality of passage openings F to the inner cooling chamber C. It flows off from the latter through an outlet pipe G. The chamber B is arranged in the cylinder cover A in such a manner that the water therein does not serve to immediately cool the hot portions of the cover, but that chamber B serves only as a storage tank for a greater quantity of cooling water, whilst the cooling action proper upon the cover bottom H turned toward the combustion chamber, and upon the central valve casting is effected by the cooling water in the annular cooling chamber C. Now in order to obtain a uniform passage of the cooling water from chamber B to chamber C and a satisfactory distribution thereof on the latter several openings F are provided in the partition D for the passage of the cooling water which openings are uniformly distributed on the circumference of partition D. The total passage area of the openings F is smaller than that of the outlet pipe G. In this manner the cooling water flowing through the openings F is dammed up in chamber B and a notable drop of pressure is produced between chambers B and C. Consequently practically equal quantities of water pass through all openings F and flow radially toward the center of cover A over the bottom H, which is the surface to be cooled. By a suitable distribution of the openings F therefore uniform cooling of the bottom H, facing the combustion chamber, of cover A, and of the valve casing is obtained. Without the provision of this damming effect and drop of pressure resulting therefrom, the water fed to chamber B would substantially flow to chamber C through that opening F which is the next to the admission pipe E, so that the bottom H of the cover would not be cooled uniformly. This would result in objectionable heat stresses in the material and with possibilities of fracture of the cover.

Plugs J screwed into cover A project with their smooth ends into the bored openings F so as to throttle the passage area of the latter to enable suitable regulation of the drop of pressure to an extent depending on the diameter of the plugs J. Owing to the provision of these plugs the passages F have the shape of annular passages which prevent passage of greater foreign bodies, this being an advantage over simple bores of circular cross section.

The heat quantities to be led off by the cooling water in an internal combustion engine are particularly great relatively to the area unit of the cylinder cover. Consequently, besides a uniform distribution of the cooling water on the bottom H of the cover, the highest possible velocity of flow of the water is required. In order to obtain such a high velocity of flow, a considerably greater quantity of cooling water has to be fed to the cylinder cover in the time unit than to the cylinder jackets of the engine. This greater supply is achieved according to the invention in a simple manner by the cooling water flowing through the jackets of at least two cylinders in parallel connection and then through the appurtenant cylinder covers in series connection.

Figures 2 and 3 illustrate this manner of conducting the cooling water. Here the water flows through the admission pipe K to the cylinder jacket L and through admission pipe $K^1$ to the other cylinder jacket $L^1$. When leaving the jackets L and $L^1$ through the pipes M and $M^1$ these two water currents are united in a common pipe leading to the one cylinder cover A and thereupon to cover $A^1$, that is in series connection.

I claim:—

1. An internal combustion engine having a cylinder cover including a cooling water fore-chamber and a cooling water chamber proper, a water inlet on said fore-chamber and a water outlet on said cooling chamber proper, said two chambers intercommunicating by a plurality of uniformly distributed passages the total area of which is smaller than that of said water outlet.

2. An internal combustion engine having a cylinder cover including a cooling water fore-chamber and a cooling water chamber proper, a water inlet on said fore-chamber and a water outlet on said cooling chamber proper, said two chambers intercommunicating by a plurality of uniformly distributed passages the total area of which is smaller than that of said water outlet, and externally controlled means for varying the area of said passages.

3. An internal combustion engine having a cylinder cover including a cooling water fore-chamber and a cooling water chamber proper, a water inlet on said fore-chamber and a water outlet on said cooling chamber proper, said two chambers intercommunicating by a plurality of uniformly distributed passages the total area of which is smaller than that of said water outlet, and plugs adapted to be adjusted from outside and to project into said passages.

4. A multicylinder internal combustion engine having cylinder covers each including a cooling water fore-chamber and a cooling water chamber proper, a water inlet on said fore-chamber and a water outlet on said cooling chamber proper, said two chambers intercommunicating by a plurality of uniformly distributed passages the total area of which is smaller than that of said water outlet, a water jacket on each cylinder, means for separately feeding cooling water to each water jacket, means for commonly conducting the cooling water from at least two of said water jackets to one of the appurtenant cylinder covers and from the latter to the other appurtenant cylinder cover.

The foregoing specification signed at Hamburg, Germany, this 3rd day of May, 1930.

HANS DUNKELMANN.